United States Patent [19]

Griffin

[11] Patent Number: 4,678,003
[45] Date of Patent: Jul. 7, 1987

[54] SAFETY CAP FOR VALVE ON HIGH-PRESSURE CYLINDER

[76] Inventor: Beacher C. Griffin, Rte. 1, Box 292, Pamplico, S.C. 29583

[21] Appl. No.: 917,548

[22] Filed: Oct. 10, 1986

[51] Int. Cl.[4] ............................................. F16K 27/12
[52] U.S. Cl. ................................... 137/382; 220/85 P
[58] Field of Search ...................... 137/381, 382, 382.5; 220/4 B, 4 E, 85 P, 259, 340

[56] References Cited

U.S. PATENT DOCUMENTS

| | | | |
|---|---|---|---|
| 1,413,502 | 4/1922 | Steinmetz | 137/382 |
| 4,022,343 | 5/1977 | Richardson | 220/85 P |
| 4,301,828 | 11/1981 | Martin, Jr. | 137/382 |
| 4,332,331 | 6/1982 | Fawley | 137/382 |
| 4,352,370 | 10/1982 | Childress | 137/382 |
| 4,613,055 | 9/1986 | Connors | 220/85 P |

Primary Examiner—Martin P. Schwadron
Assistant Examiner—Sheri M. Novack
Attorney, Agent, or Firm—Walter F. Wessendorf, Jr.

[57] ABSTRACT

A safety cap for protecting against damage and tampering the shut-off valve of a high-pressure gas cylinder. The safety cap has a female threaded base bracket which is engaged with the male-threaded neck ring of the gas cylinder. Hinges carried by the base bracket and symmetrical shield halves pivotally mount the shield halves. Positive-lock hinge clamps maintain the shield halves in abutting closed position to protect the shut-off valve. The clamps can be unclamped and the shield halves fully opened to provide full and unrestricted access to the shut-off valve.

6 Claims, 4 Drawing Figures

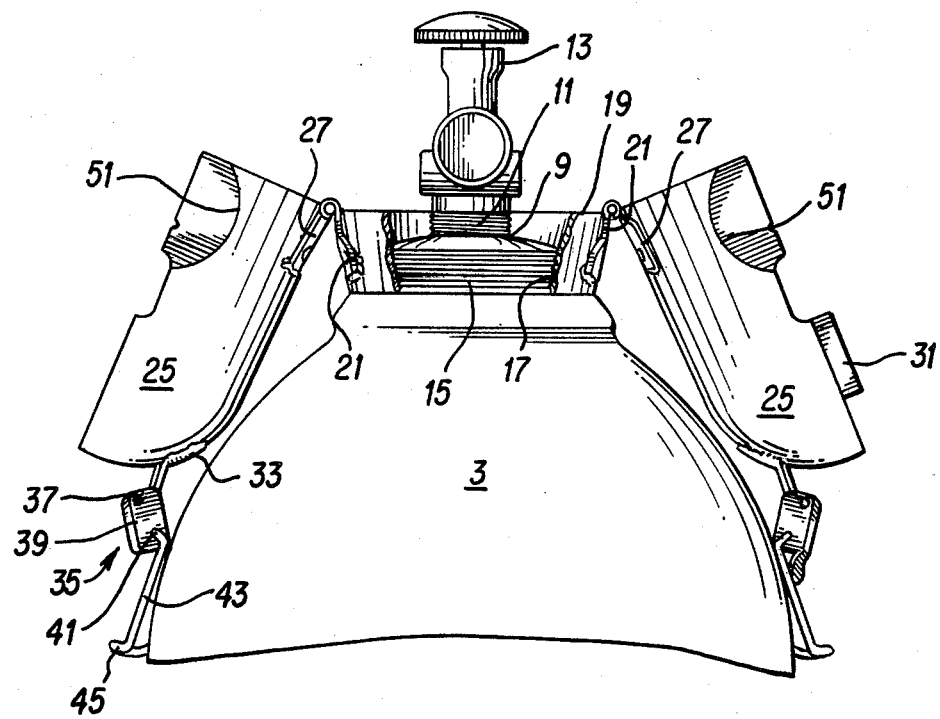
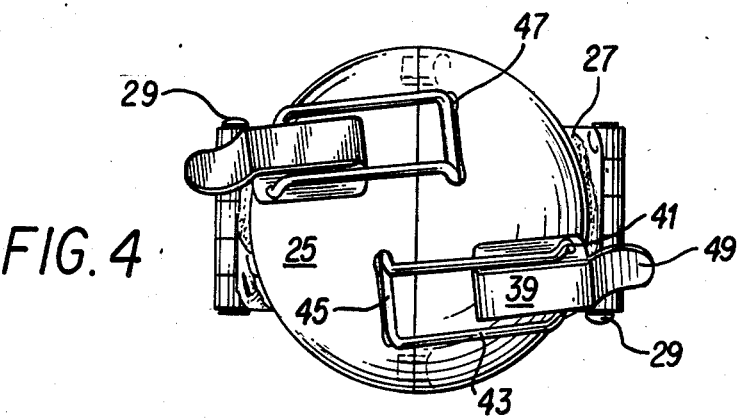

SAFETY CAP FOR VALVE ON HIGH-PRESSURE CYLINDER

BACKGROUND OF THE INVENTION

1. Technical Field

This invention relates to a safety cap for use with the valve on a high-pressure gas cylinder to protect the valve against damage and tampering.

2. Background

High-pressure gas cylinders hold industrial and welding gases, carbon dioxide, oxygen, propane, nitrogen, argon, freon, helium, hydrogen, etc. The gas pressures can range from 2,000 to 3,000 psi. Upon delivery of a high-pressure gas cylinder to its ultimate destination be it a plant, factory, shop, hospital, etc., it is installed for use with its shut-off valve connected to a regulator which has its own monitoring pressure guage. In such installation the valve is exposed to damage and tampering with such high-pressure gas cylinder having sufficient propulsive force to drive through a 12" block wall in the event the shut-off valve is broken off or damaged.

The problem in the art to which this invention appertains is the need for a safety cap for use with the shut-off valve on a high-pressure gas cylinder so that the valve not only can be protected against damage while being transported to its ultimate destination, but also will function to protect the valve when the gas cylinder is installed against damage and tampering.

SUMMARY OF THE INVENTION

Accordingly, the object of the invention is to contribute to the solution of the discussed problem of the art by providing such a safety cap which can be removably installed on the gas cylinder. The safety cap has a threaded female base bracket which is removably installed on the male-threaded neck ring of the high-pressure gas cylinder. Hingedly mounted with respect to the base bracket are two protective shield halves which, upon being closed, entirely cover and protect the gas-cylinder's shut-off valve. Each protective shield half mounts a positive-lock hinge clamp which is clamped to the other shield half. The safety cap can be removably mounted on the cylinder's neck ring and the hinged shield halves closed and clamped together to protect the shut-off valve during transport. After delivery to its ultimate destination, the shield halves can be fully opened to provide full and unrestricted access to operatively connect the regulator to the shut-off valve, and the shield halves can again be closed and clamped together in positive-lock relationship.

BRIEF DESCRIPTION OF THE DRAWINGS

This object and other objects of the invention should be discerned and appreciated from the detailed description taken in conjunction with the drawings, wherein like reference numerals refer to similar parts throughout the several views, in which:

FIG. 3 is a side view of the safety cap mounted on a gas cylinder, and with the two shield halves of the safety cap completely open; and FIG. 4 is a top view of the safety cap.

DESCRIPTION OF THE PREFERRED EMBODIMENT

Figure 2:
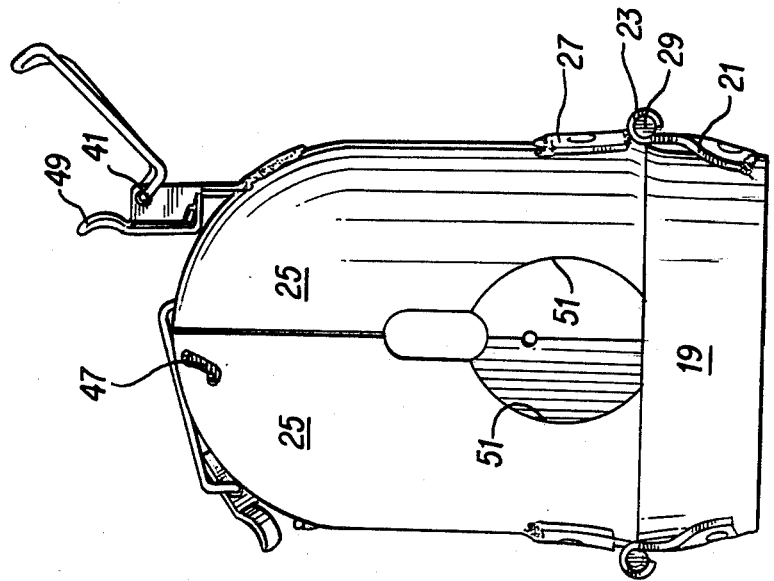
FIG. 2 is a side view of the safety cap by itself.
Figure 1:
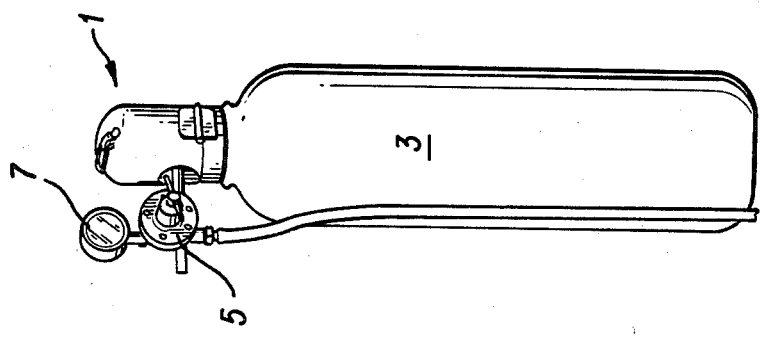
FIG. 1 is a view showing the safety cap installed on a high-pressure gas cylinder.

In FIG. 1 of the drawings, reference numeral 1 generally refers to the invention showing the safety cap installed on the high-pressure gas cylinder 3 with an operatively connected regulator 5 and monitoring pressure guage 7.

As shown in FIG. 3, the top end of the gas cylinder 3 has a tapped hole 9 engaged by the male-threaded end 11 of a shut-off valve 13, and an external male-threaded neck ring 15 engaged by the female-threaded portion 17 of a base bracket 19.

Fixedly mounted in symmetrical relationship on opposing sides of base bracket 19, such as being welded thereto, are the bottom leaves 21 of common double-leaf hinges 23. Fixed to symmetrical protective shield halves 25, such as being welded thereto, are the top lewaves 27 of the hinges 23. The hinges 23 have hinge pins 29 which define the lateral axes of the shield halves 25. Transversely projecting from one of the shield halves 25 are guide tabs 31 which are received in and thereby align the other shield half 25 to thereby facilitate closing together of the shield halves 25 in abutting relationship.

Fixed to shield halves 25, such as being welded thereto, are the bottom leaves 33 of positive-lock hinge clamps 35. As shown, the bottom leaves 33 pivotally mount via cross pins 37 intermediate manipulative members 39 which pivotally mount cross pins 41 of L-shaped legs 43. Distally, the L-shaped legs 43 have small legs 45 which engage slots 47 formed in the shield halves 25. The intermediate members 39 have thumb tabs 49 which facilitate manipulative clamping down of the hinge clamps 35. In the positive-lock position of the hinge clamps 35, the pivot points defined by the cross pins 41 of the intermediate members 39 mounting the L-shaped legs 43 are below the pivot points defined by the cross pins 37 of the bottom leaves 33 mounting the intermediate members 39.

To fixedly and removably mount the safety cap 1 on the gas cylinder 3, the human operator appropriately grasps the shield halves, guides the base bracket 19 over valves 13 and down upon threaded neck ring 15 for threading engagement of its female-threaded portion 17 with threaded neck ring 15, settles the female-threaded portion 17 of base bracket 19 down upon threaded neck ring 15, and tightens same. In such described mounting of the safety cap 1 on the gas cylinder 3, the shut-off valve 13 remains installed and the shield halves 25 remain clamped together via hinge clamps 35 because the female-threaded portion 17 of the base bracket 19 has sufficient clearance so as not to interfere with shut-off valve 13.

After the safety cap 1 has been mounted on the gas cylinder 3, the regulator 5 can then be operatively connected to shut-off valve 13 because the shield halves 25 can be thereafter closed or opened and not interfere with the regulator 5 for the reason of the clearance provided by cut-away portions 51. As shown in FIG. 3, the shield halves 25 open up completely in turning about their lateral axes 29 to provide and afford unrestricted access radially and longitudinally relative to the exposed shut-off valve 13 to turn valve 13 on or off; to remove, repair or replace valve 13; or to remove, repair or replace regulator 5.

Safety cap 1 allows the gas cylinder 3 to be delivered or transported with shut-off valve 13 installed and the shield halves 25 clamped together. At its delivery destination and installation site, the shield halves 25 can be unclamped and opened to permit the regulator 5 to be operatively connected to valve 13, and the shield halves 25 can then be closed and reclamped to prevent any damage and tampering thereafter with the shut-off valve 13.

Having thusly described my invention, I claim:

1. A safety cap for use with a high-pressure gas cylinder having a shut-off valve, said shut-off valve having radial and longitudinal axes, said safety cap having a closed position to protect said shut-off valve against damage and tampering, said safety cap having an open position to provide unrestricted access to said valve; said safety cap comprising a base bracket. hinge means, shield halves, clamping means; said gas cylinder and base bracket having cooperating means mounting said base bracket in removable fixed relationship on said cylinder and without interfering with said shut-off valve, said base bracket carrying said hinge means, said shield halves having lateral axes, said hinge means pivotally mounting said shield halves to turn about their said lateral axes, said shield halves being pivotable in one direction toward each other for abutting relationship of said shield halves and defining the closed position of said safety cap with said shield halves protecting said valve against damage and tampering, said shield halves being pivotable in the opposite direction away from each other and defining the open position of said safety cap providing such unrestricted access radially and longitudinally to said valve, and said shield halves carrying said clamping means for clamping together said shield halves and maintaining said shield halves in their abutting relationship in the closed position of said safety cap.

2. A safety cap in accordance with claim 1, wherein said gas cylinder has a male-threaded neck ring, said base bracket having a female-threaded portion, said cooperating means mounting said base bracket in fixed relationship on said gas cylinder being said male-threaded neck ring engaged with said female-threaded portion of said base bracket.

3. A safety cap in accordance with claim 1, wherein said hinge means comprise leaf hinges having bottom leaves and top leaves, said base bracket carrying said bottom leaves and said shield halves carrying said top leaves.

4. A safety cap in accordance with claim 3, wherein said leaf hinges have pins, said pins of said leaf hinges defining the lateral axes of said shield halves.

5. A safety cap in accordance with claim 1, wherein one of said shield halves has guide tabs received in the other shield half to facilitate closing together of said shield halves in abutting relationship.

6. A safety cap in accordance with claim 1, wherein said clamping means comprise positive-lock hinge clamps having bottom leaves, intermediate manipulative members and L-shaped legs, said shield halves carrying said bottom leaves, said bottom leaves pivotally mounting said manipulative members, said manipulative members pivotally mounting said L-shaped legs, said shield halves having slots, said L-shaped legs distally having small legs engaged with said slots of said shield halves.

* * * * *